3,062,730
METHOD OF MAKING OZONE
Robert A. Ruehrwein, Dayton, Ohio, assignor to the United States of America as represented by the Secretary of the Army
Filed June 18, 1959, Ser. No. 821,338
2 Claims. (Cl. 204—176)

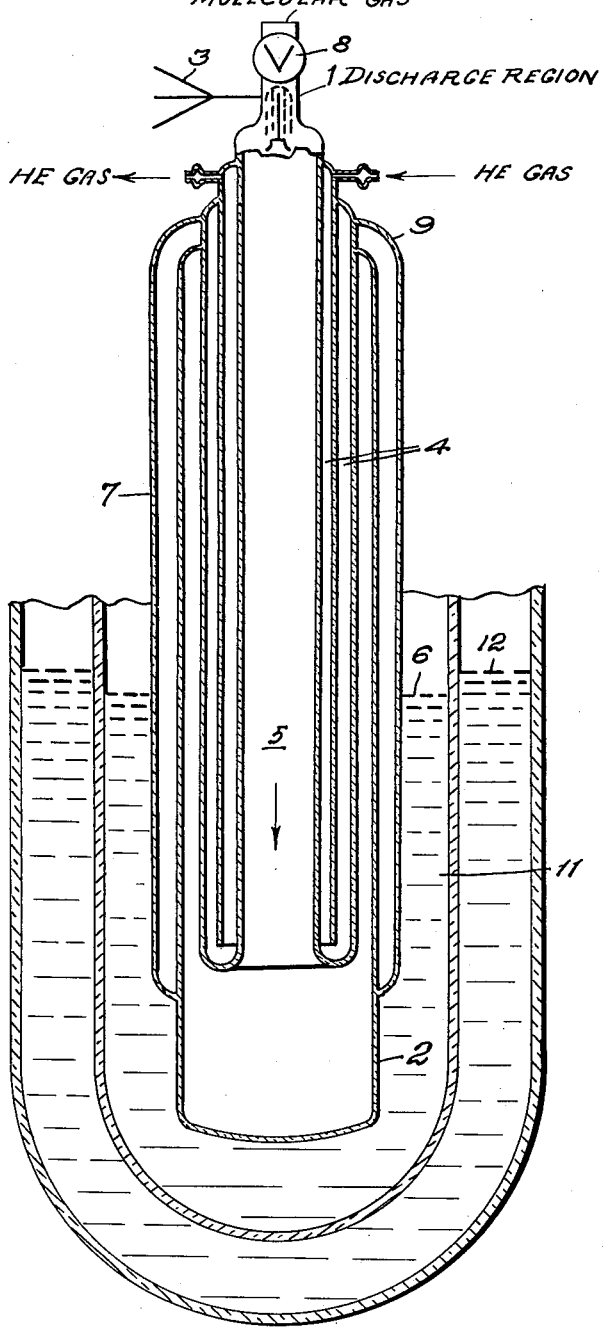

This invention relates to a method for producing ozone and more particularly to a method of stabilizing atomic oxygen in solid form at very low temperatures formed from an electrical discharge through molecular gases.

Reference is made to the patent application of Herbert P. Broida et al., Serial No. 484,860, filed January 28, 1955, now Patent No. 2,892,766, wherein there is disclosed the formation and stabilization of atoms and free radicals.

As pointed out in the Broida et al. application, supra, it is well known that atoms and short lived molecules such as O, H, N, and OH can be pumped from an electrical discharge region in concentrations of several percent. These concentrations appear when certain gases containing large amounts of any of the above-mentioned group are passed through an electrodeless electrical discharge. Before the work of Broida et al. the products so produced have been highly unstable and remain uncombined for only a short time. However, it was found that if the resultant products from the electrical discharge were immediately subjected to an extremely low temperature, the result was a substantial deposit of a solid concentration of an atomic form of the element or material or a solid concentration of free radicals. Broida et al. used the above noted process and experimented with molecular gases such as $N_2$, $O_2$, $H_2$ and/or $H_2O$.

An object of this invention is to utilize the above described process to produce very high yields of ozone.

Another object of this invention is to subject nitrogen dioxide gas to an electrical discharge and then subject the resultant products to a very low temperature to produce a high yield of ozone.

These and other objects will become more apparent when reference is had to the following detailed description.

The single figure in the drawing illustrates the apparatus utilized in carrying out the process of the present invention.

The apparatus illustrated in the drawing is similar to that utilized by Broida et al. The molecular gas containing atoms or radicals to be frozen out is introduced through a control stopcock 8 from a source of molecular gas such as a commercial gas cylinder and passes through a discharge region 1 at a high vacuum in the order of 0.1 to 10 millimeters of mercury. The discharge in discharge region 1 is excited by means of a microwave voltage of 2450 megacycles per second induced by antenna 3 which in turn is supplied from any suitable high frequency source. The single wall lower extremity 2 immersed in liquid helium 11 acts as a trap by freezing out all gases other than helium and thus constitutes in effect a high speed vacuum pump for maintaining the flow of gas. In order to prevent solidification of discharge products at temperatures above 4.2° K. (the liquefaction temperature of helium) the flow is carried to the region 2 within a passageway kept nearly at room temperature. This relatively high temperature is maintained by forcing helium gas at room temperature between compound walls 4 surrounding the channel 5 through which the discharge products pass. Since these walls make solid contact with the remainder of the system only at the upper extremity, as shown at 9, the introduction of such a sheath of warm gas extending considerably below the liquid helium level 6 causes but a slight heat input. By this means, however, the products of the discharge pass abruptly from room temperature to the collecting vessel 2 at approximately 4.2° K. and accumulate in solid form upon contact with the walls of vessel 2. A vacuum region 7 surrounds the entire assembly above the chamber 2. The liquid helium bath 11 may be insulated from the outside temperature by an additional bath of liquid nitrogen 12 to reduce the amount of liquid helium required to maintain vessel 2 at a very low temperature. The various parts of the apparatus described are fabricated from Pyrex glass.

To establish a basis of comparison oxygen gas was introduced into the apparatus through stopcock 8, subjected to an electrical discharge of 2450 mc. and the products condensed in the trap 2 at the boiling point of helium (4.2° K.). On gradual warming the deposit became quite deeply colored dark violet at about 25° K. Upon further warming the deep blue two liquid phase oxygen-ozone system was clearly evident. The oxygen was pumped off at liquid nitrogen temperature (77° K.) and measured volumetrically and the volume of the remaining liquid ozone determined. It was found that approximately 12% of the oxygen had been converted to ozone.

Nitrogen dioxide gas was now subjected to the same process to form a solid condensate in the trap 2. The condensate was warmed and analysed and it was found that 64% of the oxygen was in the form of ozone. The amounts of the various products formed are shown in the following table:

| | Millimoles |
|---|---|
| $NO_2$ discharged | 10.91 |
| $N_2$ analysed | 5.14 |
| $O_2$ analysed | 3.53 |
| $O_3$ analysed | 4.67 |
| NO analysed | .51 |
| $NO_2$ analysed | .12 |

The deposit initially was frosty and dark red-brown in color. After warming, the violet of solid ozone was evident and after distilling off the ozone the residual deposit was pale green by reflected light.

The principal products, as indicated, were nitrogen, oxygen, ozone, and nitric oxide. The nitrogen-oxygen mixture was measured volumetrically and then condensed in a solid nitrogen trap and the vapor pressure measured as a rough check on the composition. Ozone was determined as above. The nitric oxide-nitrogen dioxide mixture was analyzed by measuring the gas volume before and after treating the mixture with oxygen (and then separating the oxygen) to convert any NO to $NO_2$. From the change in gas volume and knowing the constants for the two equilibria $$NO + NO_2 = N_2O_3$$
$$2NO_2 = N_2O_4$$

the starting composition was calculated.

It will be seen that the present process utilizing nitrogen dioxide produces ozone far in excess of ozone produced by utilizing oxygen gas.

I claim:

1. The method of producing ozone in a solid state in combination with solid molecular gases comprising subjecting a flow of nitrogen dioxide at ambient temperature to a high frequency electrical discharge capable of dissociating the gas and rapidly passing the products of said discharge into a low temperature trap maintained between 4.2° and 77° K. by surrounding liquid helium.

2. The method of producing ozone in a liquid state by subjecting nitrogen dioxide gas at ambient temperature and at a pressure of 0.1 to 10 mm. Hg to a high frequency electrical discharge capable of dissociating said gas and passing the products of said discharge into a low temperature region of between 4.2 and 77° K., gradually warming the solidified products to release molecular oxygen and to liquefy the ozone so formed.

References Cited in the file of this patent

UNITED STATES PATENTS

| | | |
|---|---|---|
| 2,850,446 | Cromwell | Sept. 2, 1958 |
| 2,876,188 | Thorp et al. | Mar. 3, 1959 |
| 2,892,766 | Broida et al. | June 30, 1959 |

OTHER REFERENCES

Chemical Abstract, volume 22, No. 11 (June 10, 1928), page 1914.